United States Patent
Thomas

(10) Patent No.: US 6,846,545 B2
(45) Date of Patent: Jan. 25, 2005

(54) IMPACT ABSORBING MATERIAL

(75) Inventor: Howard Thomas, Auburn, AL (US)

(73) Assignee: Auburn University, Auburn, AL (US)

( * ) Notice: Subject to any disclaimer, the term of this patent is extended or adjusted under 35 U.S.C. 154(b) by 273 days.

(21) Appl. No.: 10/055,468

(22) Filed: Jan. 23, 2002

(65) Prior Publication Data

US 2003/0008584 A1 Jan. 9, 2003

Related U.S. Application Data

(60) Provisional application No. 60/263,644, filed on Jan. 24, 2001.

(51) Int. Cl.[7] .............................................. B32B 3/02
(52) U.S. Cl. ............................... 428/85; 2/2.5; 428/86; 428/359; 428/911; 428/87; 428/88; 428/89; 428/90; 428/91; 428/92; 428/93; 442/304; 442/308; 442/312; 442/316; 442/319; 442/320; 442/323; 442/324; 442/333; 442/334; 442/336; 442/354; 442/381; 442/387; 442/402; 442/414; 442/382; 442/383
(58) Field of Search .......................... 2/2.5; 428/85–97, 428/359, 911; 442/304, 308, 312, 316, 319, 320, 323, 324, 333, 334, 336, 354, 381–383, 387, 402, 414

(56) References Cited

U.S. PATENT DOCUMENTS

| | | |
|---|---|---|
| 3,320,619 A | 5/1967 | Lastnik et al. |
| 3,392,406 A | 7/1968 | Pernini et al. |
| 4,681,792 A | 7/1987 | Harpell et al. |
| 4,737,402 A | 4/1988 | Harpell et al. |
| 4,879,165 A | 11/1989 | Smith |
| 5,102,723 A | 4/1992 | Pepin |
| 5,343,796 A | 9/1994 | Cordova et al. |
| 5,736,474 A | 4/1998 | Thomas |

FOREIGN PATENT DOCUMENTS

| | | |
|---|---|---|
| GB | 2 198 628 A | 6/1988 |
| WO | WO 94/21450 | 9/1994 |

Primary Examiner—Arti Singh
(74) Attorney, Agent, or Firm—Gardner Groff, P.C.

(57) ABSTRACT

A material to reduce the effects of trauma received from the impact of a projectile. One embodiment is a needle-punched, non-woven material including at least one type of ballistic fibers selected and oriented to provide a cushioning effect and maintain a high compressive restitution constant. A percentage of the fibers are oriented with at least their ends lying approximately perpendicular to the fabric plane and/or oriented to lie in a waveform generally along or parallel to the fabric plane. This enables the ends of the fibers lying perpendicular to the fabric plane to cushion the impact from the projectile by dissipating energy through compressional resistance, and the fibers along the fabric plane to reduce energy through dispersal along fiber lines, thereby reducing the trauma resulting from an impact.

49 Claims, 4 Drawing Sheets

| Fiber Type | Breaking tenacity (grams/denier) | Breaking elongation % | Initial Modulus (grams/denier) | End Use |
|---|---|---|---|---|
| Carbon | 10.8 - 24.1 | 0.4 - 1.6 | 1500 - 3000 | Aircraft/Autos/ Sporting goods |
| Nylon 6,6 (PA) | 2.9 - 7.2 | 30 - 90 | 10 - 45 | Apparel |
| Polyethylene (High performance) | 30 - 35 | 2.7 - 3.6 | 1400 - 2000 | Ballistic Resistance/ High strength fabrics and yarns |
| Glass | 9.6 - 19.9 | 3.1 - 5.7 | 310 - 380 | Technical fabrics/furniture/boats |
| Aramid (Para) | 18 - 26.5 | 1.5 - 4.0 | 500 - 1100 | Ballistic Resistance/ High strength fabrics and yarns |
| Poly (P-phenylene-2,6 - benzobisoxazole) | 42 | 2.5 - 3.5 | 1300 - 2000 | Ballistic protection/ Fire Resistant |

| Fiber Type | Breaking tenacity (grams/denier) | Breaking elongation % | Initial Modulus (grams/denier) | End Use |
|---|---|---|---|---|
| Carbon | 10.8 - 24.1 | 0.4 - 1.6 | 1500 - 3000 | Aircraft/Autos/ Sporting goods |
| Nylon 6,6 (PA) | 2.9 - 7.2 | 30 - 90 | 10 - 45 | Apparel |
| Polyethylene (High performance) | 30 - 35 | 2.7 - 3.6 | 1400 - 2000 | Ballistic Resistance/ High strength fabrics and yarns |
| Glass | 9.6 - 19.9 | 3.1 - 5.7 | 310 - 380 | Technical fabrics/furniture/boats |
| Aramid (Para) | 18 - 26.5 | 1.5 - 4.0 | 500 - 1100 | Ballistic Resistance/ High strength fabrics and yarns |
| Poly (P-phenylene-2,6 - benzobisoxazole) | 42 | 2.5 - 3.5 | 1300 - 2000 | Ballistic protection/ Fire Resistant |

Figure 1

IMPACT ABSORBING MATERIAL

CROSS-REFERENCE TO RELATED APPLICATIONS

This application claims the benefit of U.S. Provisional Patent Application Ser. No. 60/263,644, filed Jan. 24, 2001, which is hereby incorporated herein by reference in its entirety for all purposes. U.S. patent application Ser. No. 08/036,668, filed Mar. 25, 1993 and U.S. Pat. No. 5,736,474 are also incorporated herein by reference in their entireties for all purposes.

FIELD OF THE INVENTION

This invention relates generally to materials for absorbing energy from impact by or with an object. Example embodiments of the invention include non-woven materials for the reduction of trauma caused by impact with a ballistic projectile, as in "bullet-proof" garments and body armor.

BACKGROUND OF THE INVENTION

Trauma refers to injuries caused by an impact on a body even in the absence of penetration. For example, broken bones, internal bleeding and shock commonly result from shooting incidents, even when the bullet is stopped by a bullet-proof vest or other protective garment incorporating ballistic resistant fabric. In addition to injuries resulting after a ballistic projectile has been stopped by a bullet resistant vest, trauma can be caused through any substantial impact force. Examples of such impacts include sports injuries such as those sustained in football, baseball, and cycling accidents. Other area of common occurrence injuries would include falls on stairs, automobile crashes and industrial accidents as well as massive collision injuries such as those sustained in survivable airplane crashes.

Ballistic resistant fabrics, sometimes referred to as bullet-proof materials, serve to protect against penetration by a bullet or other object. There are two major markets for ballistic resistant fabrics—military and police. A third potential market, civilian applications, is presently limited to the executive business and political community by manufacturers of such garments so criminals cannot purchase these items to use in crimes. Stopping a projectile prior to entry into the body, however, does not mean that a person will necessarily survive its impact. National Institute of Justice standards differentiate ballistic protection between handguns and rifles and take into account trauma damage by measuring the deflection of the target into Roma Plastilina Number One clay backing. A deflection of 44 mm or less is considered adequate in the test. Although no correlation between this test and human subjects has been officially established, it is known that the reduction of trauma increases the likelihood of survival and reduces recovery time and medical costs. NIJ has not documented injury effects related to trauma sustained after bullets were stopped.

An important element of survival, whether it is the survival of penetration by a projectile or the impact trauma from a projectile, is the dissipation of energy prior to the projectile reaching the body. The dissipation of impact energy by a material is a measure of the efficiency of the energy absorption mechanism. The fiber response to a projectile impact is presently understood to involve elongation, slippage and breakage. Strain or compression wave velocity is expressed as $v=\sqrt{F/\mu}$, where v=strain wave velocity, F=impact force and $\mu$=linear density expressed as kg/m. At the same time, one can also express v as $\sqrt{E/\rho}$, where E=Young's modulus and $\rho$=specific gravity of material. The expression $F=E\mu/\rho$ indicates optimum dissipation of impact energy. Structures that optimize each of these properties yield the best ballistic performance.

Woven fabric dissipates energy, in this case energy transferred by impact from a projectile, at the yarn interlacings of the fabric. Thus, the energy must be distributed along the yarn axis to each interlacing point for dissipation. As a result, woven fabrics are believed to lose about one third of their strength as a result of weaving, with additional loss resulting from mechanical interaction between warp and weft yarns during tensile loading. High warp crimp in a woven structure is typically accompanied by low strength translation efficiency.

Non-woven materials typically do not suffer from this disadvantage. Manufacture of non-wovens by needlepunching is a simple operation by which a variety of properties can be obtained in the fabric by varying elements of the process in known manner, and at a substantial cost reduction over woven materials. A 1966 U.S. Department of Defense study found that a needlepunched structure containing ballistic resistant nylon could be produced at one-third the weight of a woven duck fabric while retaining 80% of its ballistic resistance. Non-wovens are currently being used in special applications such as DSM designed "Fraglight" with Dyneema® fibers to stop fragments.

As polymer science has progressed, "ballistic" fibers such as high tenacity polyamides, aramids and linear high-density polyethylene (HDPE) have been developed, and have been found to be applicable for ballistic resistant applications. The protection offered per unit weight of the material has increased greatly along with greater comfort and less bulk.

Despite such improvements in ballistic-resistant materials for preventing penetration by a projectile, developments in the reduction of non-penetration trauma have not advanced as rapidly. Known trauma reduction methods include the provision of rigid plates and polyurethane foams. Plates used for trauma reduction are generally heavy and uncomfortable, and are not permeable to air or moisture such that a garment can breathe. And some plates have been found to break or deform upon high-energy impact, sometimes causing the plate to become a projectile capable of inflicting injury. Known foam padding is typically uncomfortably thick, and also traps heat and moisture.

Thus, it can be seen that needs exist for improved materials for absorbing energy from impact by or with an object and reducing resultant trauma to the body, and for related methods and devices.

SUMMARY OF THE INVENTION

Example embodiments of the present invention include an impact absorbing material, protective garments comprising the impact absorbing material, protective garments comprising the impact absorbing material in combination with a ballistic penetration resistant material, and liners comprising the impact resistant material to be worn under ballistic penetration resistant garments. It should be noted that although the impact absorbing material and other embodiments of the invention are described herein primarily in the context of ballistic protection, the material and other embodiments of the invention are also applicable for use in the prevention or minimization of blunt trauma from virtually any form of impact. Because ballistic projectiles are commonly considered the most difficult from which to prevent trauma injury, they are primarily addressed herein. Other applications of the disclosed material will be evident to those skilled in the art.

In one aspect, the invention is an impact resistant material. In preferred embodiments, the material includes a plurality of in-plane fibers defining a fabric plane, and a plurality of upright fibers, wherein at least a portion of each upright fiber is oriented generally perpendicular to the fabric plane. The upright fibers are preferably a ballistic fiber material.

In another aspect, the invention is a ballistic resistant vest. In preferred embodiments, the vest includes at least one layer of ballistic penetration resistant material. The vest preferably also includes at least one impact resistant layer formed of a plurality of in-plane fibers defining a fabric plane, and a plurality of upright fibers. At least a portion of each upright fiber is preferably oriented generally perpendicular to the fabric plane. The upright fibers are preferably of a ballistic fiber material.

In still another aspect, the invention is a liner for a ballistic resistant vest. In preferred embodiments, the liner includes at least one impact resistant layer. Each impact resistant layer preferably includes a plurality of in-plane fibers defining a fabric plane; and a plurality of upright fibers, wherein at least a portion of each upright fiber is oriented generally perpendicular to the fabric plane. The upright fibers are preferably a ballistic fiber material.

In yet another aspect, the invention is an impact resistant material comprising a plurality of fibers. At least a portion of the plurality of fibers are preferably in-plane fibers defining a fabric plane, and at least 25% of the plurality of fibers are upright fibers oriented generally perpendicular to the fabric plane.

In still another aspect, the invention is a method of fabricating an impact-resistant material. The method preferably includes forming a fiber mat comprising at least one layer of fibers, the fiber mat defining a mat thickness. The method preferably also includes needlepunching the fiber mat to a depth of no more than about ⅓ the mat thickness.

These and other aspects, features and advantages of the embodiments of the invention described herein will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGURES

FIG. 1 is a table of example fibers and specifications applicable for use with preferred forms of a trauma reduction material according to the present invention.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 2:
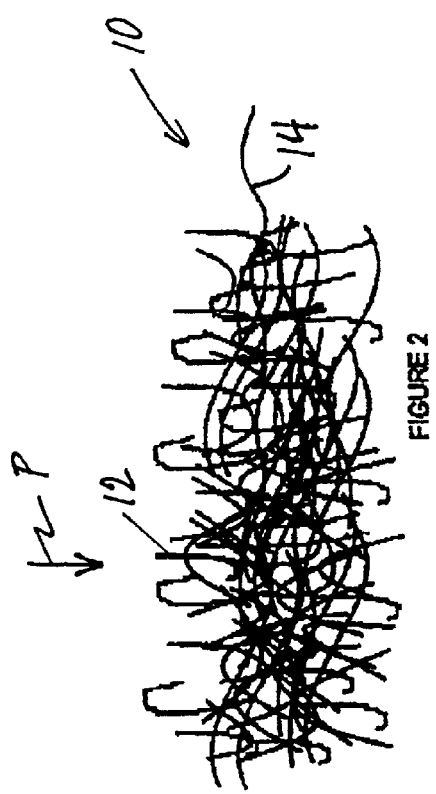
FIG. 2 is a cross-sectional view showing an example fiber orientation within a trauma reduction material according to a preferred form of the present invention.
Figure 5:
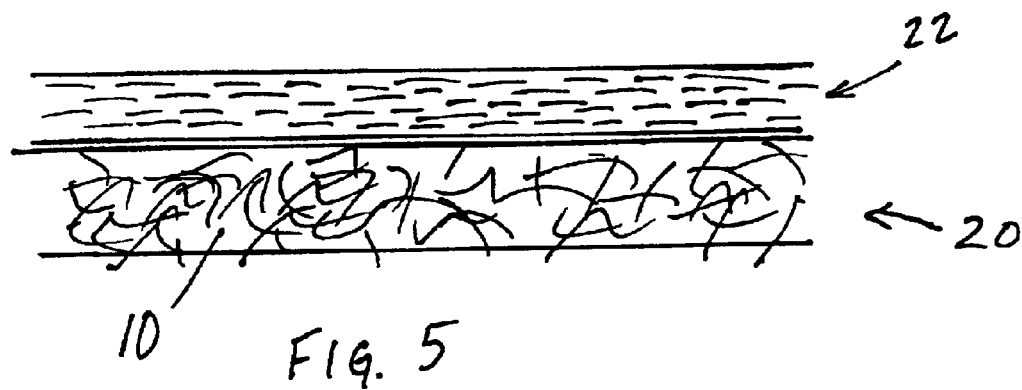
FIG. 5 is a cross-sectional view of a portion of a ballistic penetration resistant garment and a liner of an impact absorbing material according to a preferred form of the present invention.
Figure 6:
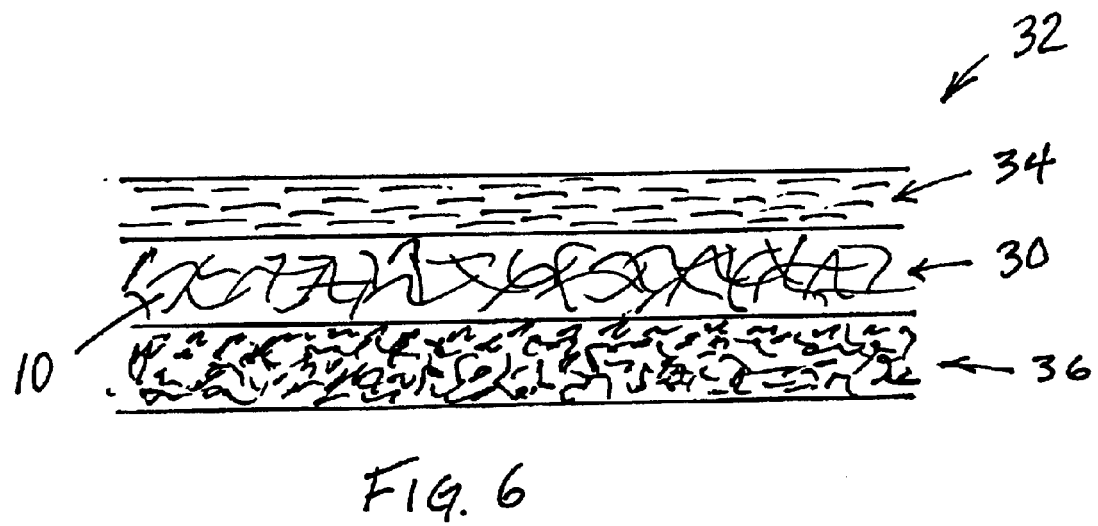
FIG. 6 is a cross-sectional view of a portion of a garment having ballistic penetration resistant and impact absorbing layers, according to a preferred form of the present invention.

In one embodiment, and with reference now to FIGS. 2, 5 and 6, the present invention is a material 10 for reducing trauma caused by the impact of a projectile. The material 10 preferably comprises a plurality of strong, stiff upright fibers 12, having at least a portion of their length oriented in a direction generally perpendicular to the overall plane of the material 10 (and generally parallel to the path P of an incoming trauma producing object) as seen in FIG. 2. This fiber orientation allows the upright fibers 12 to act together as a ballistic spring "pillow" to absorb a large amount of energy from the projectile, thereby reducing shock or trauma to the underlying body. In addition to the upright fibers, the material 10 further comprises a plurality of in-plane fibers 14, substantially the entire lengths of which remain generally parallel to the overall plane of the material 10 to help hold the fabric together. In other words, if a piece of the material 10 defines a plane in the X and Y coordinates, the upright fibers 12 are oriented at least partially in the direction of a Z coordinate perpendicular to the X-Y plane, whereas the in-plane fibers 14 are generally parallel to the X-Y plane.

The upright fibers 12 preferably comprise a "ballistic" fiber material such as high-tenacity polyamides, aramids, carbon fibers, nylon, glass, linear high-performance high-density polyethylene (HPPE), high-modulus polyester, ultra-high-modulus polyethylene, coal-tar based fibers, aniline-based fibers, PBO, natural and/or synthetic spider silk, genetically engineered high-modulus fibers, and other high-modulus, high-tenacity and/or high-strength fibers. The fibers are preferably cut into fiber segments of approximately equal lengths. The fiber segment length is preferably between about one inch and four and a half inches, more preferably from about one to three inches, and most preferably between about one to two inches. The fibers preferably have a strength within the range of about 3 to 40 grams per denier (gpd); a stiffness within the range of 80 to 1500 grams per denier; and a fineness of less than 10 denier, most preferably within the range of 0.25 to 10 denier. Particularly preferred ballistic upright fibers 12 include:

Aramid Fibers: Belonging to the polyamide family of fibers but with amide links formed between aromatic rings. This chemistry allows very rigid, long chain structures with high modulus, high tensile strength and high temperature resistance. Two typical aramids used in ballistic resistant fabrics are DuPont Kevlar®) and Akzo Nobel Twaron®).

Polyethylene fibers: An additive polymer based on simple carbon-to-carbon links. Formation of high performance polyethylene (HPPE) requires a special withdrawal procedure called gel spinning. Such fibers have extremely linear molecular chains, resulting in very high parallel orientation and crystallinity. This fiber type has very low specific gravity and tensile strength 15 times greater than steel. This family of fibers includes the Dyneema®) products from DSM and the Spectra® products from Allied Signal. Each generation of HPPE fibers has increased ballistic resistance with lower weight required for the threat level. These materials have tensile strengths of 30–40 gpd, elongation to break of 2.5–3.6%, Young's modulus of 1400–2400 gpd, specific gravity of about 0.97, and are usually uniaxially wrapped and resin encased.

PBO: Poly(p-phenylene-2,6-benzobisoxazole), a rigid-rod, isotropic, crystal polymer fiber marketed by Toyobo of Japan under the trade name "Zylon" [http://www.toyobo.cojp/e/seihin/kc/pbo]. Data from Toyobo indicates that the tensile modulus of PBO is greater than carbon, HPPE or aramid fiber types. The fiber is chemically more similar to aramid than to HPPE and therefore has great resistance to heat. Its specific gravity is higher than HPPE, however, so the sonic modulus of the fiber is lower than the linear polyethylenes. The PBO structure is:

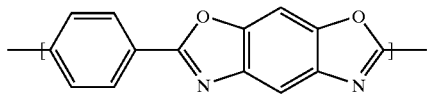

Figure 3:
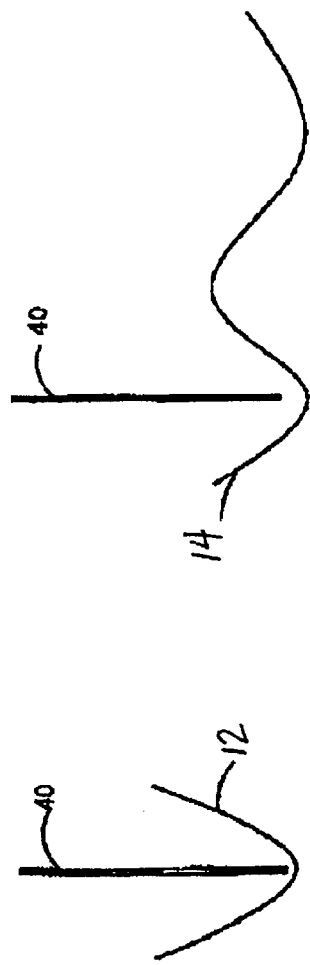
FIG. 3 depicts the bending of a short fiber in response to needling, according to a preferred form of the present invention.

The material 10 of the present invention preferably comprises a needle-punched, non-woven material incorporating upright fibers 12 directed into the desired orientation by needle penetration, as illustrated in FIG. 3; or alternatively is a woven material comprising upright fibers 12. For example, a non-woven material according to the present invention can be fabricated by opening and carding fibers to separate fiber clumps or bundles and parallelize the fibers into thin layers of fiber. A plurality of these thin layers may then be cross-lapped onto one another, preferably at offset angles between adjacent layers, such as an alternating 45° offset (net 900° offset between layers). The cross-lapped mat may then be needlepunched to consolidate the fibers of different layers into a unitary material 10 having the desired fiber orientation. Needlepunching tends to compress and draft (i.e., draw inward) the material to some extent, and to integrate the cross-lapped layers together. In a particularly preferred embodiment, 40 to 50 layers of parallelized fiber, most preferably about 44 layers, each layer being about 0.5 mm thick, may be cross-lapped to form a fiber mat of about 20–25 mm thick, and the mat is needlepunched to a density of between about 400 to about 550 punches per square inch to result in a material 10 having a final weight of between 2 to 4 ounces per square yard. The material 10 may then be cut and formed, as by stitching, to form a garment or other object.

Figure 4:
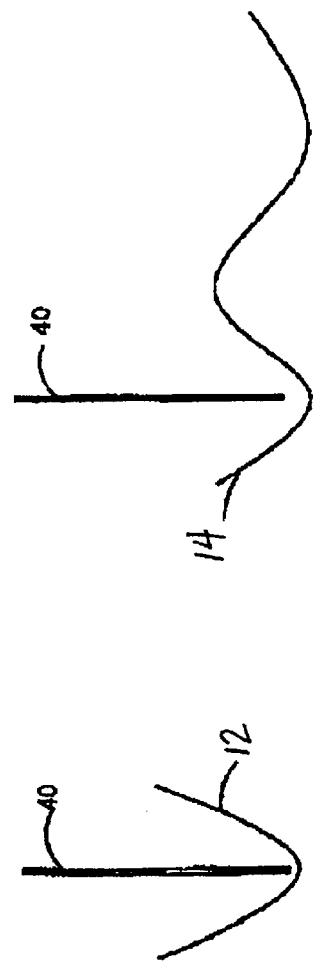
FIG. 4 depicts a waveform fiber orientation imparted on a longer fiber in response to needling, according to a preferred form of the present invention.

In preferred form, substantially all of the fibers are of about equal length, most preferably in the range of about one inch to about two inches. Some degree of length variation, however, will still produce acceptable impact resistance and is within the scope of the invention. For example, fiber lengths in the range of about one to one half inches can be mixed with longer lengths of up to about three inches or longer. It is preferably, however, that the percentage of shorter lengths be at least about 50% to ensure a sufficient percentage of upright fibers result from needlepunching. A shorter fiber length generally results in a greater percentage of those fibers that are directly impacted by the needles 40 being oriented along at least a portion of their lengths in the direction of needle travel. Longer fibers and fibers that are not directly impacted by the needles 40 remain generally on the horizontal plane, for example in the waveform geometry shown in FIG. 4 and serve to maintain the integrity of the sheet of material. It has been found that substantially larger variations in fiber lengths, and fiber lengths above about three inches begin to reduce the effectiveness of preferred embodiments of the material 10 in absorbing impact and preventing trauma. In applications where the fibers have mixed lengths, for example one, two and three inches, the longer fibers will generally tend to orient in the waveform geometry rather than orient perpendicularly. However, if a fabric surface is penetrated by needling toward the end of the fiber, at least an end portion of the longer fibers will orient generally perpendicularly. The preferred lengths used in the tests hereinafter were 1 to 2 inches, although the fiber lengths used in the Kevlar/Spectra/PBO example were 1 inch to 3 inches in length as the PBO fibers were manually cut, yielding a wide range.

To provide the desired cushioning effect of the material 10 and maintain a compressive restitution constant of the material while maintaining a high interstitial population, the fibers of preferred embodiments of the invention have a needle punch density of between about 300 to 700 punches per square inch, and more preferably about 400 to 550 punches per sq. inch. Although needle punch densities approaching the upper and lower limits of these ranges may not maximize trauma reduction, the impact trauma protection provided would still likely exceed current technology. In preferred embodiments, at least about 25%, and more preferably at least about 50% of the fibers of the material 10 are upright fibers 12 having at least one of their ends lying approximately perpendicular to the fabric plane, while the remainder of the fibers are in-plane fibers 14, preferably oriented to lie in a waveform (FIG. 4) generally parallel to the overall fabric plane. Preferably, at least about 5–10%, and more preferably at least about 20–25% of the length of the upright fibers 12 is turned or crimped into an orientation generally perpendicular to the overall plane of the material 10. Most preferably, substantially the entire length of the upright fibers 12 is oriented generally perpendicular to the overall plane of the material 10, as shown for example in FIG. 3. This preferred fiber geometry enables at least the end portions of the upright fibers 12 to cushion the impact from a projectile by dissipating energy through compression and bending. The in-plane fibers 14 further reduce energy through dispersal within the fabric planar surface, thereby reducing the trauma resulting from an impact, and also assist in maintaining the integrity of the material 10. Since the ratio between upright fibers 12 and in-plane fibers 14 is primarily dependent upon the needle punching density, the estimated ratio may be calculated prior to manufacturing. An estimated percentage of fiber rearrangement can be determined by taking the number of punches per square inch divided by the number of fibers per cubic inch of the material.

Some or all of the needlepunching needles 40 are preferably high-loft needles, having a reversed barb for grabbing fibers on their retraction stroke. Alternatively, standard needles 40 are utilized, and the depth of needle penetration of some or all of the needles 40 is controlled to be relatively shallow, for example about 2–5 mm into the fiber mat. In preferred embodiments, the needlepunching depth is no more than about ½, and more preferably no more than about ⅓ the thickness of the fiber mat.

Figure 7:
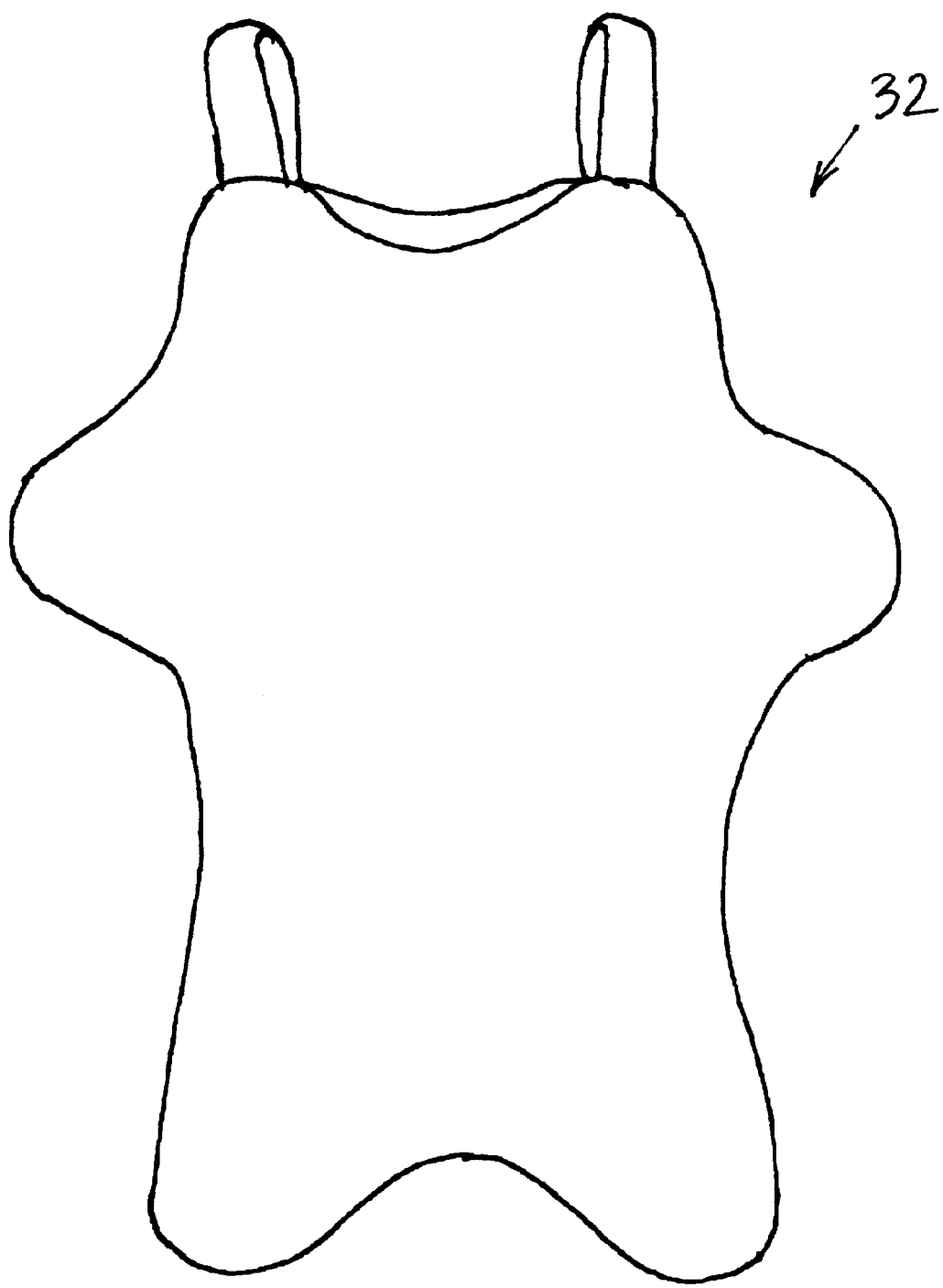
FIG. 7 shows a ballistic resistant vest incorporating an impact-resistant material for trauma reduction according to a preferred form of the present invention.

With reference now to FIGS. 5–7, the present invention further comprises a shield, garment or other item at least partially comprising the disclosed impact resistant material 10. For example, one or more panels of impact trauma protection material 10 can be incorporated as an integral part of the structure of a bullet resistant vest itself, or can be used independently as a "liner" 20 under an existing vest 22. The provision of an impact resistant liner 20 according to the present invention allows the trauma protection benefits of the invention to be retrofit to existing vests 22 and used with vests 22 already in the marketplace. In addition, different degrees of trauma protection may be obtained by changing out the liner 20 of a single vest 22, and/or a soiled or damaged liner 20 can be replaced without the expense of replacing the entire vest 22. The liner 20 can comprise a zipper or other means for attachment to the vest 22, or can be a separate and unattached garment.

In another embodiment of the invention, described with particular reference to FIGS. 6 and 7, the disclosed impact resistant material 10 comprises a trauma reducing layer 30 of a ballistic resistant vest 32, between the ballistic resistant layer 34 vest and the user's body. When the vest 32 is impacted with a projectile, the force is spread, to some degree, through the ballistic resistant material 34. As the ballistic material 34 and the projectile impact the trauma reduction layer 30, the upright fibers of the material 10 are compressed, in the manner of a spring. Because of the fiber stiffness, more energy is required to compress the fibers than is needed for a lower modulus material. As the fibers compress, the nonwoven construction spreads the energy through the in-plane fibers of the material 10, dissipating additional energy from the projectile impact. Neighboring fibers in the nonwoven material 10 lie in frictional contact with each other to hold the fabric structure together. The fiber-to-fiber contact points provide efficient energy transfer points within the fiber structure when ballistic impact from a projectile occurs. Because some of the ballistic force vector is directly parallel to the upright fibers' axes, the impact load is absorbed immediately as compressional resistance. Other force vectors must be transferred orthogonally from the fabric plane into the perpendicular plane by means of fiber frictional contact from the structural and composing fibers in the fabric plane at the points where they contact upright fibers. The structural fibers serve as load bearing fibers that maintain the integrity of the fabric. Composing fibers are interlaced into the structure and, although they do not actually hold the fabric together, they are energy absorptive in a ballistic impact. Alternatively, energy is also transferred by fibers that lie partially in the fabric plane and are then directed orthogonal to the fabric plane as a result of the nonwoven fabric formation process.

In a particularly preferred embodiment of the invention, an impact resistant layer 30 of material 10 as disclosed herein is sandwiched between an outer layer 34 of ballistic resistant material and an inner layer 36 of ballistic resistant felt (for example, as disclosed in U.S. patent application Ser. No. 08/036,668, incorporated by reference herein). The ballistic resistant layer 34 preferably comprises an aramid, HPPE, PBO or other ballistic resistant fabric; the impact resistant layer 30 preferably comprises a non-woven material 10 of about three ounces per square yard; and the ballistic resistant felt layer has a weight of about twenty ounces per square yard. The layers 30, 34, 36 can be attached to one another by laminating, adhesive, zipper or other fastener, or by other attachment means. Alternatively, the layers 30, 34, 36 are independent unattached layers.

As seen in the examples and tests herein, non-woven materials 10 according to the present invention have shown a great value as a trauma reduction device, or shield, when placed between the innermost layer of ballistic resistant clothing and the body of the wearer. In similar manner, the material 10 and garments, shields and other items comprising the material 10 according to the present invention are readily adapted to achieving a reduction in body trauma from any source of impact. For example, impact resistant materials 10 of the present invention can be incorporated in or with helmets and protective equipment for sports, in automotive and airplane interiors, in protective padding, in packaging, and in virtually any other application where protection against damage or injury from impact is desired.

The following examples illustrate representative embodiments of the invention, and sample results obtained from those embodiments:

TEST SET A

Tests of nonwoven trauma reduction fabrics were conducted in accordance with NIJ standard 0101.03 regarding Level II threat protection (9 mm 124 grain full metal jacket @ 1175±50 ft/sec). Clay backing was used to measure back face signature (BFS) for standard material and for combined test panel configurations. NIJ standards require 44 mm or less of deformation (BFS) after impact. The tests were performed by a qualified independent ballistic technician. In these tests, improved Level II vest panels were constructed using guidelines based on Auburn Textile Engineering field-testing. These vests were compared to standard market type vests. All tests use a 124 grain FMJ 9 mm projectile at Level II threat velocity (min 353 m/sec and max. 373 m/sec). Sample 2 Material is KM2, Spectra 1000–3.5 denier.

Tests were conducted on two (2) sample materials manufactured in configurations to maintain a similar or reduced panel weight (pounds/ft$^2$) to one another. Sample 1 is a 3" fiber, 1.5 denier Kevlar 29/5.5 denier Spectra 1000 fabric designed for fragment protection; Sample 2 is a 1.5", 1.5 denier Kevlar Military (KM2) and 3.5 denier Spectra 1000 fabric designed for trauma reduction. In the following examples the Sample 1 fabric samples were specifically blended and needle punched for fragment- and bullet resistant performance with 3"fiber lengths needled to 750 punches/sq. in. Impact trauma reduction fabric samples were 1.5" fiber lengths±0.5", needled to 500 punches/sq. in. The testing utilized a baseline material and, subsequently, configurations of woven and non-woven materials. The baseline used for this effort was 15 plies of KM2 material. Table I shows examples the various nonwoven/woven combinations that can be used to tailor or customize the effectiveness of soft armor panels to absorb ballistic energy with a lighter weight configuration. The combinations in Table I were used in the tests herein.

TABLE I

Test Panel Configurations

| Designation | Panel configuration | Comments |
|---|---|---|
| Baseline | 1 ply 1000 denier Cordura<br>15 ply KM2 woven<br>1 ply 1000 denier Cordura | The Cordura covers were added to all tests to prevent clay contamination to panels |
| Trial 1 | 1 ply 1000 denier Cordura<br>10 ply KM2 woven<br>3 ply Sample 2<br>1 ply 1000 denier Cordura | Sample 2 is KM2 and Spectra 1000 @ 3.5 denier. Weight is 0.25 grams/in$^2$. Nominal thickness is 0.25" |
| Trial 2 | 1 ply 1000 denier Cordura<br>10 ply KM2 woven<br>2 ply Sample 2<br>1 ply 1000 denier Cordura | |
| Trial 3 | 1 ply 1000 denier Cordura<br>5 ply KM2 woven<br>4 ply Sample 1<br>5 ply KM2 woven<br>1 ply 1000 denier Cordura | Sample 1 is K29 and Spectra 1000 @ 5.5 denier. Weight is 0.158 grams/in$^2$. Nominal thickness is 0.085" |
| Trial 4 | 1 ply 1000 denier Cordura<br>7 ply KM2 woven<br>4 ply Sample 1<br>3 ply KM2 woven<br>1 ply 1000 denier Cordura | |
| Trial 5 | 1 ply 1000 denier Cordura<br>7 ply KM2 woven<br>5 ply Sample 1<br>1 ply KM2 woven<br>1 ply Sample 2<br>1 ply 1000 denier Cordura | |

The results of tests performed on the combinations of Table I are illustrated in Table II. It should be noted that the referenced number of layers excludes the front and back Cordura layers.

TABLE II

| TRIAL | PANEL WEIGHT (Pounds/Ft$^2$) | BACK FACE SIGNATURE (inches) | PANELS PENETRATED | RESIDUAL LENGTH OF PROJECTILE (inches) | VELOCITY (ft/sec) |
|---|---|---|---|---|---|
| Baseline | 0.70 | 1.273 | 5 | 0.244 | 1202 |
| 1 | 0.68 | 0.796 | 2.67 | 0.296 | 1204 |
| 2 | 0.61 | 1.088 | 3.33 | 0.307 | 1199 |
| 3 | 0.66 | Full pen. | All | 0.438 | 1191 |
| 4 | 0.66 | 1.131 | 4.5 | 0.272 | 1198 |
| 5 | 0.69 | 1.014 | 3.33 | 0.311 | 1184 |

Based upon the information shown in Table II, the following comparisons to the woven KM2 aramid baseline fabrics are observed:

Baseline trial 5 of the 15 layers of fabric were penetrated, yielding a backface deformation of 32.3 mm.

Trial 1 Using three (3) layers of the Sample 2 material provided approximately a 35% reduction in BFS compared to the baseline at an equivalent panel weight. Additionally, the number of panels penetrated was reduced by almost half.

Trial 2 Using two (2) layers of the Sample 2 material provided a twelve (12%) percent lighter weight panel with better BFS results over the baseline. Fewer panels were also penetrated than with the baseline material. The construction of the material of Trial 1 and Trial 2 are identical except for the number of nonwoven layers.

Penetration was reduced in NIJ Level 2 tests by the addition of consecutive layers of trauma pad material behind the conventional ballistic resistant materials approximately in a relationship of:

$$P = -0.624L + 4.456$$

where P=layers of material penetrated and L=layers of trauma pad material present. Based on the foregoing formula, there will be no penetration at all with between 7 and 8 layers of trauma material present.

Trial 3 The trauma test failed because the projectile penetrated.

Testing using 4 layers of Sample 1 material indicates that layer configuration is critical for ballistic resistance.

Trial 4 Test results using four (4) layers of Sample 1 material with seven (7) layers of facing KM2 indicates that proper layering can achieve equivalent protection to the baseline fabric at lower weight. The trauma results were similar to the baseline fabric material with Sample 1 material since this Sample is optimized for ballistic penetration resistance rather than impact trauma reduction.

Trial 5 Five layers of Sample 1 (ballistic penetration optimized) and only one layer of Sample 2 (trauma reduction optimized) material were used with KM material. This configuration provided a material that provided a 20% reduction in BFS at an equivalent panel weight. Also less deformation of the projectile was produced (similar to Trial #2) indicating an ability to potentially transfer energy into the armor material more effectively than can be accomplished by the baseline fabrics.

TEST SET B

Evaluations of blended fiber nonwoven trauma pads were conducted at Auburn University to evaluate the effect of the nonwoven material in combination with woven PBO ballistic resistant material. The baseline for the tests was a standard, commercial Level II Kevlar 29 vest without any supplemental nonwoven layers. This vest was supplemented with nonwoven layers and compared to the performance of woven PBO fabrics in various layer configurations during the field evaluations at Auburn University, Auburn, Ala. In order to determine the trauma reduction performance of variations of needle-punched nonwoven fabrics, the nonwoven trauma reduction pads were constructed as follows:

Pad #1: 50% Kevlar 29 aramid and 50% Spectra 1000 HPPE of fiber lengths 1 to 2 inches were needlepunched at 500 punches per square inch. The pad consisted of four (4) layers of material.

Pad #2: 50% Kevlar 29 aramid and 50% Spectra 1000 HPPE of fiber lengths 3 to 4 inches were needlepunched at 750 punches per square inch. The number of layers making up each pad are in accordance with Table III.

Pad #3: A blend of Kevlar 29, Spectra 1000 and Zylon PBO. The material ratios on this pad are in the range of 45% Kevlar/45% Spectra and 10% Zylon at needlepunch density of 500 punches/square inch. These ratios and punch densities can be adjusted to provide features specific to end use. For example, although PBO is effective in inhibiting the transfer of local high energy density, it is less effective in reducing waveform broadcast energy for deformation. The foregoing tested embodiment used four (4) layers of material.

The results of the tests are illustrated in Table III below. Tests were performed using NIJ Level II standards for .357 magnum and 9 mm handgun projectiles and with targets positioned in front of Roma Plastilina Number One clay backing.

TABLE III

All Tests Conducted From 5 Meters Range
Trauma impression, in mm ± 1 mm, produced in
Roma Plastilina Number 1 (US National Institute of
Justice Standard is 44 mm or less) Failures are shown in italics.

| Tested material | Weight | .357 magnum | 9 mm |
|---|---|---|---|
| Level II Kevlar 29 vest | 711 grams | 45 mm | 38 mm |
| Level II Kevlar 29 vest With nonwoven trauma pad #1 | 946 grams | 8 mm | 10 mm |
| Zylon PBO 14 layers | 270 grams | 52 mm | 50 mm |
| Zylon PBO 28 layers | 539 grams | 51 mm | 54 mm |
| Zylon PBO 28 layers With nonwoven trauma pad #1 | 505 grams | — | 32 mm |
| Zylon PBO 7 layers + 3 layers nonwoven pad #2 + 7 layers PBO | 291 grams | 48 mm | — |
| Zylon PBO 7 layers + 3 layers nonwoven pad #2 + 7 layers PBO With nonwoven trauma pad #3 | 525 grams | 21 mm | — |

— indicates that the material combination was not tested with that projectile size due to the lack of variation in the test results. There is little variation from 9 mm to .357 magnum, therefore all fabrics were not tested with all projectiles.

TEST SET C

In order to test for critical trauma, a very severe trauma measurement standard was developed and used as the criteria in the following tests conducted at Auburn University. A piece of corrugated cardboard weighing approximately 0.2 lbs/ft² is used as a test backing in place of Roma Plastilina #1 clay. In this new test, the standard is that the backing layer of cardboard must not break when a target vest in front of it absorbs the impact of a bullet fired from five (5) meters distance or less. Breakage of the cardboard backing layer is considered a test failure.

Trial 6 As a baseline, standard, commercial Level II vests were impacted by a 9 mm, 115 grain or greater projectile fired from a range of 5 meters or less. In a series of six (6) projectile firings conducted with standard Level II vests, the cardboard backing was broken, but not penetrated by the projectile, after impact. The bullet was stopped in the ballistic resistant fabric.

Trial 7 The Level II vest type from Trial 6 was backed with 4 layers of nonwoven 50% Kevlar 29 and 50% Spectra 1000, weighing approximately 0.055 lbs/ft² per layer (total additional weight~0.22 lbs/ft²). The vest combination was impacted as stated in Trial 6, using six (6) test firings. The cardboard exhibited no breakage and in two (2) cases, a 9 mm bullet exhibited no penetration of the vest and was propelled back away from the vest. The behavior of the two bullets was possibly a variation within experimental error such as variation in bullet propellant factory loading.

Trial 8 The Level II vest type of Trial 6 was backed with 6 layers of nonwoven 100% Kevlar 29 composed of 1 to 2 inch fibers and weighing approximately 0.035 lbs/ft² per layer (total additional weight~0.21 lbs/ft²). The vest combination was impacted with six (6) test firings as stated in Trial 6. The cardboard exhibited no breakage behind the vest with 115 grain projectiles. A crack in the cardboard surface approximately 20 mm in diameter was exhibited with a 147 grain JHP 9 mm projectile, but the surface was not totally perforated.

Trial 9 The Level II vest type as used in Trial 6 was backed with 4 layers of nonwoven 100% polyester, weighing approximately 0.055 lbs/ft² per layer (total additional weight~0.22 lbs/ft²). The vest combination was impacted with six (6) firings as stated in Trial 6 above. The cardboard exhibited a perforation after the projectile was stopped in the vest. The projectile penetrated 10 of the 21 woven Kevlar 29 layers present in the Level II vest, perforating the remaining layers and breaking the cardboard backing. The continued damage, or simulated trauma, to the material and cardboard through perforation rather than penetration was due to impact. The same shock waves that perforated the material would cause extensive, if not fatal, damage to internal organs. This test indicates the importance of fiber type selection for a trauma reduction pad to perform successfully.

Trial 10 The Level II vest type of Trial 6, without nonwoven backing, was tested using a 12 gauge shotgun slug of one (1) ounce weight from five (5) meters range. The vests did stop the projectile, however the vests were propelled through an impact fracture opening in the cardboard approximately 6" in diameter and were subsequently displaced approximately 10 feet behind the target impact point.

Trail 11 The Level II vest/vest type of Trial 6 was supplemented with 4 layers of nonwoven containing Kevlar and Spectra blended fibers (as described above) and impacted using the Shotgun set forth in Trial 10. Not all of the potential impact trauma was eliminated and the cardboard backings were broken, producing some creases and splits all the way through the backing in the impact areas. However, the target vest remained in place during 4 of the 6 test firings during which time there were no large diameter breakages, or holes, in the cardboard, like those present when only the Level II vest, without the nonwoven backing, was in place. In the case of target displacements when the nonwoven layers were used, the vest dropped less than 3 feet from the target. Indications are that additional nonwoven backing is required to eliminate all trauma effects from 12 gauge shotgun slugs, but improvements of more than 300% were already achieved.

TEST SET D

Another consideration in the performance of ballistic resistant and trauma reducing fabrics is heat trauma and air permeability of fabrics. Many police and military personnel do not wear their ballistic resistant equipment because it is too hot and unpleasant to use. Materials and garments of the present invention provide improved comfort as a result of their increased air and vapor permeability. Using an air permeability measurement tester at Auburn University Department of Textile Engineering, the air permeability of commercial ballistic resistant vest material was compared to the air permeability present when trauma reduction nonwoven was present with those materials. Results of the tests are shown in Table IV below and expressed in cubic feet/minute air permeability (CFM).

Baselines for these tests were:

A Level 3A, 100% Spectra Shield tactical vest as used by units such as the FBI SWAT teams and Hostage Rescue Unit.

A Level 2A police duty vest such as many patrol officers wear in the normal performance of their duties. It was composed of 100% woven Kevlar 29 aramid fabric.

Other designs were examined, using woven Kevlar 29 with 1500 denier yarns (designated "heavy weave" in Table IV) and using woven Kevlar 29 with 840 denier yarns (designated "K-29" in Table IV below.)

TABLE IV

Air permeability test results

| Vest type and material | Air permeability (CFM) |
| --- | --- |
| 1. Level 3A 100% Spectra Shield vest | 0.0 |
| 2. Level 2A 100% woven Kevlar 29 | 0.0 |
| 3. Level 2A 100% woven Kevlar 29 With nonwoven trauma pad (238 gm Sample 2 @ 7 layers) | 4.1 |
| 4. 3 layers Kevlar 29 (hvy wv) + 6 layers Sample 1 | 2.8 |
| 5. 1 layer K-29 (hvy wv), 1 layer Kevlar 129, 1 layer Sample 1 | 3.3 |
| 6. 2 layers Kevlar 29 (hvy wv), 6 layers Sample 1, 2 layers Sample 2 | 3.0 |

Sample 1 and Sample 2 refer to the materials cited in Test Set A above.

The increased air permeability through the inclusion of Sample 2 material is clearly seen in the foregoing table. The highest air penetration was in combination #3 that included seven layers of the preferred material. The construction of the material disclosed increases the air permeability from 0 (#2) up to 4.1 cubic feet per minute (combination #3). The addition of the disclosed material not only enables airflow when combined with standard non-permeable materials, but enhances air flow when combined with other air permeable ballistic materials.

Fabrication of a Nonwoven Trauma Reduction Device:

Any thermoplastic and non-thermoplastic fibers that meet the requirements for ballistic materials can be used to construct a nonwoven trauma reduction pad according to the present invention, for ballistic protection and/or protection from other forms of impact. Specifically, any "ballistic category" fiber, including aramids, high performance polyethylenes, PBO fibers, carbon fibers, ballistic glass fibers and ballistic nylons can be used either in combination or standing alone to achieve the same or similar results. Important considerations include:

fiber strength, preferably within the range of 3 to 40 grams/denier;

fiber stiffness, preferably within the range of about 80 to 1500 grams/denier;

fiber length, preferably in the range of about one to three inches; and fiber fineness, preferably having a denier of about 0.75 to 10.0.

The chart of FIG. 1 provides greater detail regarding example materials meeting these criteria, suitable for use in connection with the present invention.

Effect of the Invention to Prevent Injuries:

As can be seen by the foregoing tests, the disclosed nonwoven, whether integrated within, or used as a separate liner to a ballistic vest, has been found to produce dramatic reduction in the level of trauma resulting from impact by or with a ballistic projectile or other object.

While the invention has been described with reference to preferred and example embodiments, it will be understood by those skilled in the art that a number of modifications, additions and deletions are within the scope of the invention, as defined by the following claims.

What is claimed is:

1. An impact resistant material comprising:
   a plurality of in-plane fibers defining a fabric plane; and
   a plurality of upright fibers, wherein at least a portion of each upright fiber is oriented generally perpendicular to the fabric plane, said upright fibers comprising a ballistic fiber material, wherein said upright fibers comprise at least about 25% of said material.

2. The impact resistant material of claim 1, comprising a non-woven, needle-punched material.

3. The impact resistant material of claim 2, comprising a needlepunch density of at least 300 punches per square inch.

4. The impact resistant material of claim 2, comprising a needlepunch density of about 400 to 550 punches per sq. inch.

5. The impact resistant material of claim 1, wherein the ballistic fiber material is an aramid, a high performance polyethylene, a PBO fiber, a carbon fiber, a ballistic glass fiber or a ballistic nylon fiber.

6. The impact resistant material of claim 5, wherein the ballistic fiber material has a fiber strength of at least about 3 grams/denier.

7. The impact resistant material of claim 5, wherein the ballistic fiber material has a fiber stiffness of at least about 80 grams/denier.

8. The impact resistant material of claim 5, wherein the ballistic fiber material has a fiber length of less than about 4½ inches.

9. The impact resistant material of claim 5, wherein the ballistic fiber material has a fiber length of less than about 2 inches.

10. The impact resistant material of claim 5, wherein the ballistic fiber material has a fiber fineness of no more than about 10.0 denier.

11. The impact resistant material of claim 1, wherein said upright fibers comprise at least about 50% of said material.

12. The impact resistant material of claim 1, having a weight of between about 2 ounces per square yard to about 4 ounces per square yard.

13. The impact resistant material of claim 1, having an air permeability of at least about 4.1 CFM.

14. A ballistic resistant vest comprising the material of claim 1, layered with a ballistic penetration resistant material.

15. A ballistic resistant vest comprising:
   at least one layer of ballistic penetration resistant material; and
   at least one impact resistant layer comprising a plurality of in-plane fibers defining a fabric plane, and a plurality of upright fibers, wherein at least a portion of each upright fiber is oriented generally perpendicular to the fabric plane, said upright fibers comprising a ballistic fiber material, wherein said upright fibers comprise at least about 25% of said at least one impact resistant layer.

16. The ballistic resistant vest of claim 15, further comprising at least one layer of ballistic resistant felt, said at least one impact resistant layer being sandwiched between said at least one layer of ballistic resistant felt and said at least one layer of ballistic penetration resistant material.

17. The ballistic resistant vest of claim 15, comprising a non-woven, needle-punched material.

18. The ballistic resistant vest of claim 17, comprising a needlepunch density of at least 300 punches per square inch.

19. The ballistic resistant vest of claim 17, comprising a needlepunch density of about 400 to 550 punches per sq. inch.

20. The ballistic resistant vest of claim 15, wherein the ballistic fiber material is an aramid, a high performance polyethylene, a PBO fiber, a carbon fiber, a ballistic glass fiber or a ballistic nylon fiber.

21. The ballistic resistant vest of claim 20, wherein the ballistic fiber material has a fiber strength of at least about 3 grams/denier.

22. The ballistic resistant vest of claim 20, wherein the ballistic fiber material has a fiber stiffness of at least about 80 grams/denier.

23. The ballistic resistant vest of claim 20, wherein the ballistic fiber material has a fiber length of less than about 4½ inches.

24. The ballistic resistant vest of claim 20, wherein the ballistic fiber material has a fiber length of less than about 2 inches.

25. The ballistic resistant vest of claim 20, wherein the ballistic fiber material has a fiber fineness of no more than about 10.0 denier.

26. The ballistic resistant vest of claim 15, wherein said upright fibers comprise at least about 50% of said material.

27. The ballistic resistant vest of claim 15, having a weight of between about 2 ounces per square yard to about 4 ounces per square yard.

28. The ballistic resistant vest of claim 15, having an air permeability of at least about 4.1 CFM.

29. A liner for a ballistic resistant vest comprising at least one impact resistant layer, each said at least one impact resistant layer comprising:
   a plurality of in-plane fibers defining a fabric plane; and
   a plurality of upright fibers, wherein at least a portion of each upright fiber is oriented generally perpendicular to the fabric plane, said upright fibers comprising a ballistic fiber material, wherein said upright fibers comprise at least about 25% of said at least one impact resistant layer.

30. The liner of claim 29, further comprising at least one layer of ballistic resistant felt, said at least one impact resistant layer being sandwiched between said at least one layer of ballistic resistant felt and said at least one layer of ballistic penetration resistant material.

31. The liner of claim 29, comprising a non-woven, needle-punched material.

32. The liner of claim 31, comprising a needlepunch density of at least 300 punches per square inch.

33. The liner of claim 31, comprising a needlepunch density of about 400 to 550 punches per sq. inch.

34. The liner of claim 29, wherein the ballistic fiber material is an aramid, a high performance polyethylene, a PBO fiber, a carbon fiber, a ballistic glass fiber or a ballistic nylon fiber.

35. The liner of claim 34, wherein the ballistic fiber material has a fiber strength of at least about 3 grams/denier.

36. The liner of claim 34, wherein the ballistic fiber material has a fiber stiffness of at least about 80 grams/denier.

37. The liner of claim 34, wherein the ballistic fiber material has a fiber length of less than about 4½ inches.

38. The liner of claim 34, wherein the ballistic fiber material has a fiber length of less than about 2 inches.

39. The liner of claim 34, wherein the ballistic fiber material has a fiber fineness of no more than about 10.0 denier.

40. The liner of claim 29, wherein said upright fibers comprise at least about 50% of said material.

41. The liner of claim 29, having a weight of between about 2 ounces per square yard to about 4 ounces per square yard.

42. The liner of claim 29, having an air permeability of at least about 4.1 CFM.

43. An impact resistant material comprising a plurality of fibers, at least a portion of said plurality of fibers comprising in-plane fibers defining a fabric plane, and at least 25% of said plurality of fibers comprising upright fibers having at least a portion of their length oriented generally perpendicular to the fabric plane.

44. The impact resistant material of claim 43, wherein at least 50% of said plurality of fibers comprise upright fibers having at least a portion of their length oriented generally perpendicular to the fabric plane.

45. A method of fabricating an impact-resistant material, said method comprising:
   forming a fiber mat comprising at least one layer of fibers, said fiber mat defining a mat thickness; and
   needlepunching said fiber mat to a depth of no more than about ⅓ the mat thickness to an extent wherein at least about 25% of said fiber mat comprises upright fibers oriented generally perpendicular to a plane defined by said fiber mat.

46. The method of claim 45, wherein said needlepunching step comprises needlepunching the mat at a density of at least 300 punches per square inch.

47. The method of claim 45, wherein said needlepunching step comprises needlepunching the mat at a density of about 400 to 550 punches per sq. inch.

48. The method of claim 45, wherein the step of forming a fiber mat comprises forming at least one layer of a mixture of aramid fibers and high-modulus polyethylene fibers.

49. The method of claim 46, wherein the mixture fibers further comprises PBO fibers.

* * * * *